(12) United States Patent
Singh et al.

(10) Patent No.: US 9,307,535 B1
(45) Date of Patent: Apr. 5, 2016

(54) MANAGING TRANSMISSION POWER FOR HYBRID-ARQ GROUPS

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 211 days.

(21) Appl. No.: 14/146,488

(22) Filed: Jan. 2, 2014

(51) Int. Cl.
| | |
|---|---|
| *H04W 4/00* | (2009.01) |
| *H04W 72/04* | (2009.01) |
| *H04W 52/02* | (2009.01) |
| *H04W 52/00* | (2009.01) |

(52) U.S. Cl.
CPC ...... *H04W 72/0453* (2013.01); *H04W 72/0473* (2013.01); *H04W 52/00* (2013.01); *H04W 52/0212* (2013.01); *H04W 52/0219* (2013.01)

(58) Field of Classification Search
CPC . H04W 52/00; H04W 52/02; H04W 52/0209; H04W 52/0212; H04W 52/0219
USPC ......................................... 370/311
See application file for complete search history.

(56) References Cited

U.S. PATENT DOCUMENTS

| | | | |
|---|---|---|---|
| 8,125,921 B2 | 2/2012 | Frenger et al. | |
| 2003/0199276 A1* | 10/2003 | Tiedemann, Jr. . | H04W 72/1289 455/450 |
| 2004/0179474 A1 | 9/2004 | Usuda et al. | |
| 2006/0153216 A1 | 7/2006 | Hosein et al. | |
| 2006/0176881 A1 | 8/2006 | Ma et al. | |
| 2008/0081655 A1* | 4/2008 | Shin ....................... | H04W 52/08 455/522 |
| 2009/0055703 A1* | 2/2009 | Kim ....................... | H04L 1/1816 714/748 |
| 2009/0109906 A1* | 4/2009 | Love ...................... | H04L 1/0026 370/329 |
| 2010/0246455 A1 | 9/2010 | Nangia et al. | |
| 2011/0249656 A1* | 10/2011 | Cai ........................ | H04L 1/0028 370/336 |
| 2012/0170479 A1* | 7/2012 | Ren ........................ | H04L 5/0055 370/252 |
| 2013/0182654 A1* | 7/2013 | Hariharan .............. | H04W 52/54 370/329 |
| 2013/0223352 A1* | 8/2013 | Sartori ................. | H04W 76/023 370/329 |
| 2013/0242889 A1* | 9/2013 | Khoryaev .......... | H04W 52/0235 370/329 |
| 2013/0310058 A1* | 11/2013 | Ibrahim ............... | H04W 72/082 455/452.1 |
| 2014/0029559 A1* | 1/2014 | Seo ....................... | H04W 72/042 370/329 |
| 2014/0036799 A1* | 2/2014 | Bharadwaj .......... | H04W 72/085 370/329 |
| 2014/0086072 A1* | 3/2014 | Maaref ............... | H04W 52/343 370/252 |
| 2015/0071183 A1* | 3/2015 | Bontu .................... | H04L 1/1861 370/329 |
| 2015/0249974 A1* | 9/2015 | Lee ....................... | H04W 72/042 370/329 |

OTHER PUBLICATIONS

U.S. Appl. No. 11/758,826, filed Jun. 6, 2007.
Office Action from U.S. Appl. No. 11/758,826, dated Jan. 20, 2010.
(Continued)

*Primary Examiner* — Farah Faroul (57) ABSTRACT

A base station that serves a plurality of wireless communication devices (WCDs) will group the WCDs into physical hybrid automatic repeat request (HARQ) channel (PHICH) groups based on channel quality reported by the WCDs and will then differentially allocate transmission power among the PHICH groups, so as to provide higher transmission power for transmission to PHICH groups of WCDs that reported lower channel quality, while providing lower transmission power for transmission to PHICH groups of WCDs that reported higher channel quality.

18 Claims, 5 Drawing Sheets

(56) References Cited

OTHER PUBLICATIONS

Office Action from U.S. Appl. No. 11/758,826, dated Jul. 28, 2010.

"cdma2000 High Rate Packet Data Air Interface Specification," 3GPP2 C.S0024-A, Section 10.7 ("Enhanced Forward Traffic Channel MAC Protocol") version 3.0 (Sep. 2006).

* cited by examiner

MANAGING TRANSMISSION POWER FOR HYBRID-ARQ GROUPS

BACKGROUND

Unless otherwise indicated herein, the materials described in this section are not prior art to the claims and are not admitted to be prior art by inclusion in this section.

In a typical cellular wireless communication system, the air interface between a base station and served wireless communication devices (WCDs) may define a downlink (or "forward link") for carrying communications from the base station to the WCDs and an uplink (or "reverse link") for carrying communications from the WCDs to the base station. In various implementations, these links may be defined on one or more carrier frequencies or blocks of frequencies. Furthermore, on each link, various channels may be defined through techniques such as time division multiplexing, code division multiplexing, and/or frequency division multiplexing.

In one implementation, the downlink and uplink may each be divided over time into a continuum of timeslots for carrying communications between the base station and the WCDs. WCDs may be arranged to transmit data, such as bearer traffic (e.g., user data) and control signaling (e.g., access requests and the like), to the base station in such timeslots on the uplink, and the base station may be arranged to transmit data, such as bearer data and control signaling (e.g., paging and other overhead messages) to the WCDs in such timeslots on the downlink. Further, the base station or associated equipment may dynamically schedule transmissions of data in particular timeslots, and the base station and WCDs may transmit according to that schedule.

To help overcome errors that may arise in wireless data transmission, the base station and served WCDs may also be arranged to apply a hybrid automatic repeat request (hybrid-ARQ or HARQ) process. In such a process, when a WCD transmits a data packet to the base station, the WCD may repeatedly attempt transmission of the packet to the base station in sequential (e.g., interlaced) timeslots, until the base station confirms that it successfully received the packet or until the WCD completes a maximum number of attempts without receiving such confirmation.

In practice, for instance, the WCD may add more error correction with each subsequent attempt and/or may transmit various portions of the packet with various error correction coding in each subsequent attempt, in an effort to have the base station ultimately receive enough data to constitute or facilitate uncovering the packet as a whole.

During this packet transmission process, the base station may transmit an HARQ message to the WCD in response to each transmission attempt from the WCD. In particular, for each transmission attempt that does not result in the base station having successfully received or uncovered the complete packet payload, the base station may transmit to the WCD on the downlink a negative acknowledgement (NACK), to prompt the WCD to engage in a next transmission attempt. On the other hand, if and when the base station received and uncovered the complete packet (e.g., the packet transmission and any associated decoding by the WCD was successful), the base station may then transmit to the WCD a positive acknowledgement (ACK), to inform the WCD that transmission of the packet was successful, thereby completing transmission of that packet.

OVERVIEW

As a base station serves multiple WCDs at once, the base station may be able to combine together transmission of HARQ messages to multiple WCDs at a time. By way of example, in a system operating with spread spectrum modulation, the base station may be able to transmit multiple such HARQ messages on one or more common carrier frequencies by using orthogonal spreading codes to distinguish between HARQ messages destined to various different WCDs. As a result, the target WCDs to which the base station would be sending HARQ messages concurrently can be considered to define an HARQ group. Further, in a system that provides a range of such frequencies, the base station may be able transmit to many such HARQ groups concurrently, with each such transmission making use of a respective set of carrier frequencies.

A particular example of this can occur in a system operating according to the Long Term Evolution (LTE) protocol or another such Orthogonal Frequency Division Multiple Access (OFDMA) protocol. In accordance with a recent version of LTE, the downlink air interface defines a continuum of radio frames, each 10 milliseconds long, and each radio frame is divided into 10 subframes each 1 millisecond long. Each subframe is then divided over a downlink frequency bandwidth into a sequence of physical resource blocks (PRBs), and each resource block is further divided into a number of resource elements (e.g., each 67 microseconds by 15 kHz) for carrying orthogonal frequency division multiplexed (OFDM) symbols.

Within each subframe, the first line of resource elements (the first 67 microseconds) across the frequency bandwidth carries certain control information from the base station to WCDs. Included in this control information are OFDM symbols defining a Physical Hybrid-ARQ Indicator Channel (PH-ICH) respectively for carrying HARQ messages to various served WCDs. Further, through use of orthogonal spread spectrum coding, the base station can transmit HARQ messaging to multiple served WCDs at once using a common set of such resource elements.

In particular, the base station may use twelve such resource elements, distributed across the frequency bandwidth in the first line of resource elements per subframe, to concurrently transmit HARQ messages to up to eight served WCDs. These twelve resource elements are considered to define three resource element group (REGs) of four resource elements each, which facilitates unique transmission of a three-bit HARQ message (e.g., 111 for ACK, or 000 for NACK) to up to eight WCDs concurrently using four-bit orthogonal spreading codes. Further, the WCDs to which each such set of resource elements carries HARQ messages concurrently, or the PHICH channels thereby defined concurrently for those WCDs, are considered to define an HARQ group or, in LTE parlance, a "PHICH group".

Moreover, the base station may provide multiple such PHICH groups concurrently across the bandwidth, with the number of PHICH groups depending on the bandwidth and on one or more other operational parameters. For instance, if the base station operates with a 10 MHz bandwidth, each subframe may support 13 concurrent PHICH groups distributed across the bandwidth, and may thus support up to 13×8=104 concurrent HARQ transmissions (i.e., HARQ transmissions to up to 104 WCDs concurrently). And as another example, if the base station operates with a 15 MHz bandwidth, each subframe may support 19 concurrent PHICH groups distributed across the bandwidth, and may thus support up to 19×8=152 concurrent HARQ transmissions (i.e., HARQ transmissions to up to 152 WCDs concurrently).

As a general matter, it is important that WCDs receive the HARQ messages that their serving base station transmits to them. This is especially so for transmissions of ACK messages, as failure to receive an ACK transmitted by the base station can cause the WCD to assume the transmission was unsuccessful and to retransmit unnecessarily. Unfortunately, however, at times a WCD may be in relatively poor coverage of its serving base station and may therefore not receive such HARQ transmissions.

Disclosed herein is a method and apparatus to help overcome this problem. In accordance with the disclosure, a base station that serves a plurality of WCDs will group the WCDs into PHICH groups based on channel quality reported by the WCDs and will then differentially allocate transmission power among the PHICH groups, so as to provide higher transmission power for transmission to PHICH groups of WCDs that reported lower channel quality, while providing lower transmission power for transmission to PHICH groups of WCDs that reported higher channel quality. More particularly, in a scenario where the base station has a set amount of transmission power that the base station can use for transmission across the first line of resource elements per subframe, the base station may take away some of that power from the transmission to the PHICH group of UEs that reported higher channel quality and add that extra power to the transmission to the PHICH group of UEs that reported lower channel quality.

Accordingly, in one respect, disclosed is a method for managing transmission power for HARQ groups in a cellular RAN that serves a plurality of WCDs. The method involves grouping the WCDs into respective HARQ groups based on channel quality reported respectively by the WCDs for downlink communication from the RAN to the WCDs. Further, the method involves differentially allocating HARQ transmission power to the respective HARQ groups based on the channel quality reported by the WCDs of each group, and transmitting HARQ messaging to each HARQ group of WCDs using the differential allocation of transmission power. In this manner, the transmission power for HARQ messaging to a first one of the HARQ groups would differ from the transmission power for HARQ messaging to a second one of the HARQ groups.

In another respect, disclosed is an eNodeB (base station) that includes an antenna structure, a power amplifier, and a controller. The antenna structure is arranged for wirelessly communicating with user equipment devices (UEs) (i.e., any wireless communication devices, whether or not actually "user" operated) served by the eNodeB over an OFDMA air interface defining a continuum of subframes each spanning a plurality of resource elements across a frequency bandwidth. Further, the power amplifier is arranged to control power of transmission within the resource elements. And the controller is arranged (i) to group the served UEs into PHICH groups based on downlink channel quality reported by the UEs, with the eNodeB transmitting HARQ messaging respectively to each PHICH group of UEs in a respective mutually exclusive group of the resource elements, and (ii) to cause the power amplifier to differentially allocate transmission power to resource elements used for transmission of HARQ messaging to the PHICH groups of UEs, the differential allocation being based on the downlink channel quality reported by the UEs of the respective PHICH groups.

In still another respect, disclosed is another method for managing transmission power for HARQ groups. The method involves a RAN serving a plurality of WCDs over an air interface between the RAN and the WCDs. Further, the method involves, while serving the plurality of WCDs, the RAN receiving channel quality reports from the WCDs, including receiving from each WCD a respective channel quality report indicating downlink channel quality between the RAN and the WCD. And the method involves the RAN grouping the WCDs into mutually exclusive HARQ groups based on the channel quality reports received from the WCDs, including grouping a first proper subset of the WCDs into a first HARQ group based on the first proper subset of the WCDs having reported relatively high channel quality and grouping a second proper subset of the WCDs into a second HARQ group based on the second proper subset of WCDs having reported relatively low channel quality.

In addition, the method involve assigning the HARQ groups to mutually exclusive sets of downlink transmission resources for transmission of HARQ messaging to the WCDs of the HARQ groups, including assigning each HARQ group to a respective set of downlink transmission resources for transmission of HARQ messaging to the WCDs of the HARQ group. Further, the method involves differentially allocating transmission power to the sets of downlink transmission resources based on the channel quality reported by the WCDs of the HARQ group assigned to each set of downlink transmission resources, and transmitting HARQ messaging to the WCDs using the assigned sets of downlink transmission resources with the differentially allocated transmission power.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of a wireless communication system in which the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
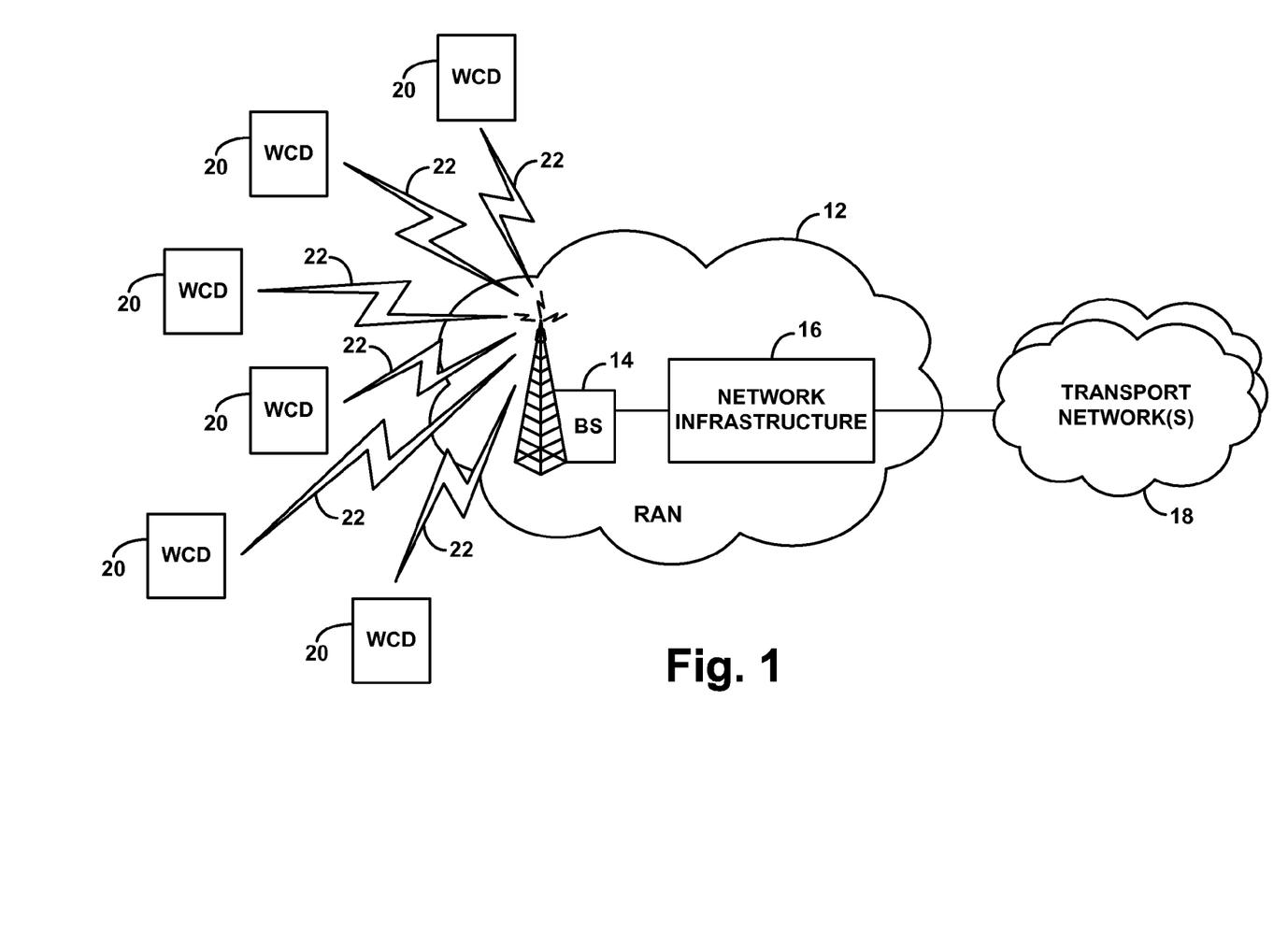
FIG. 1 is a simplified block diagram of a wireless communication system in which functions of the present disclosure can be implemented.

FIG. 1 depicts the example communication system as including at its core a RAN 12 having a representative base station 14 that radiates to define a coverage area such as a cell sector in which WCDs (e.g., cell phones, wirelessly-equipped computers, tracking devices, etc.) served by the base station may operate, and having network infrastructure 16 that provides connectivity with one or more transport 18 networks such as the public switched telephone network (PSTN) or the Internet for instance. The figure then depicts, by way of example, several representative WCDs 20 operating in the coverage area of the base station, with air interface communication 22 extending respectively between the base station and each WCD. With this arrangement, each WCD may engage in air interface communication with the base station and may communicate in turn via the network infrastructure with various entities on the transport network(s) or with other WCDs served by the RAN.

In general, the air interface between then base station and the WCDs may operate on one or more frequency channels having a particular bandwidth, and may define an uplink for carrying communications from the WCDs to the base station and a downlink for carrying communications from the base stations to the WCDs. In a frequency division duplex (FDD) arrangement, the uplink and downlink operate on different frequency channels, whereas in a time division duplex arrangement, the uplink and downlink operate on the same frequency channel and are multiplexed over time. For simplicity, the present disclosure will focus on the FDD arrangement. But it will be understood that the principles discussed can apply in a TDD arrangement as well.

The air interface between the base station and the WCDs may also operate according to any of a variety of air interface protocols, examples of which include OFDMA (e.g., LTE or Wireless Interoperability for Microwave Access (WiMAX)), Code Division Multiple Access (CDMA) (e.g., 1×RTT or 1×EV-DO), Global System for Mobile Communications (GSM), and others now known or later developed. For simplicity, however, the present disclosure will focus by way of example on an LTE air interface. In that arrangement, the base station is known as an eNodeB, and the WCDs are known as UEs. But to maintain greater generality, the description will mainly use the terms "base station" and "WCD."

Figure 2:
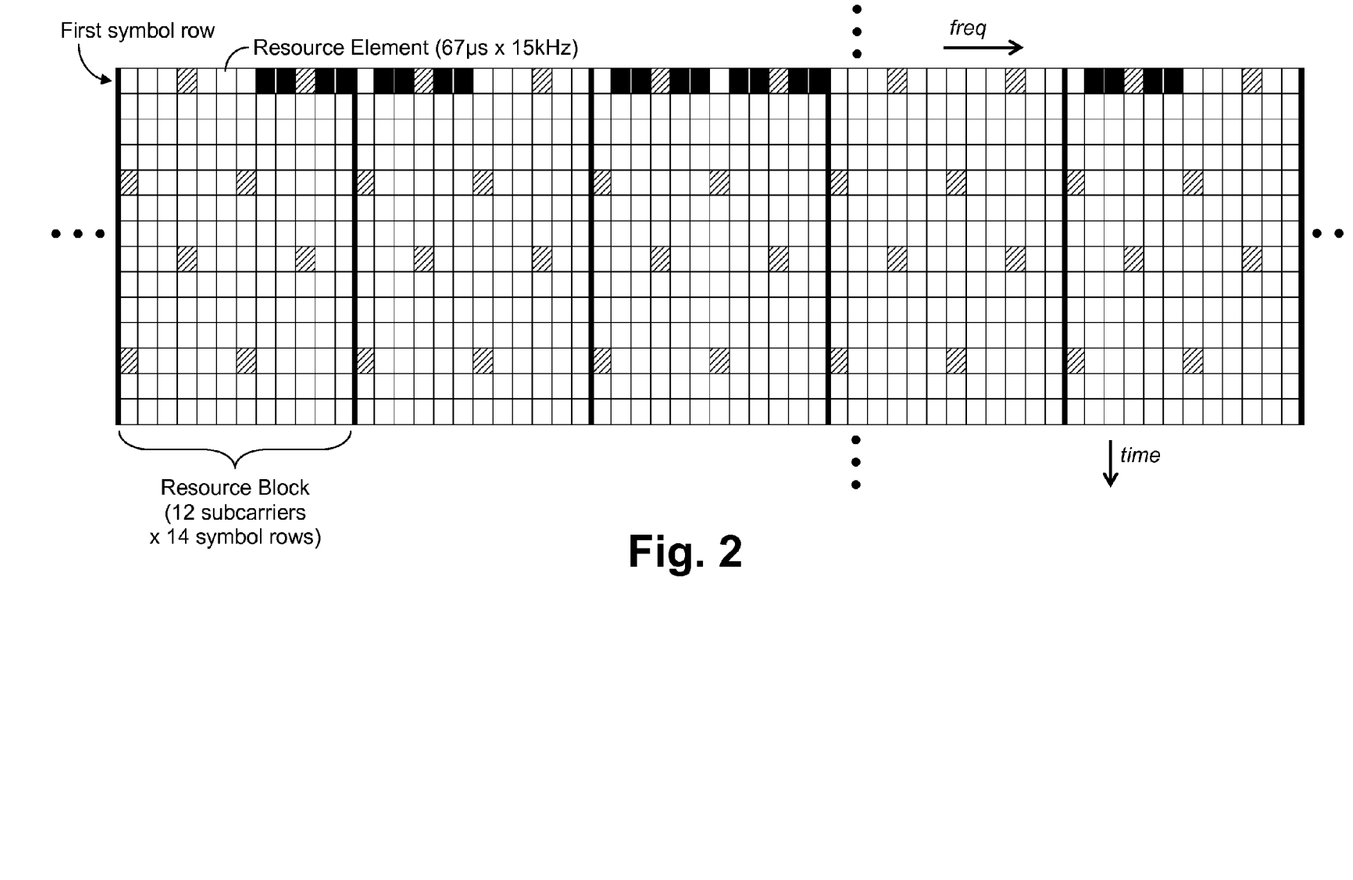
FIG. 2 is a diagram of part of an example LTE subframe.

FIG. 2 is a simplified illustration of part of a one millisecond subframe of an LTE downlink air interface. In practice, this subframe would span a particular channel bandwidth, such as 3 MHz, 5 MHz, 10 MHz, 15 MHz, or 20 MHz. However, just a small frequency portion of the subframe is shown.

As shown, the subframe, like each other subframe that would come before and after it in time, is divided into a number of 67 microsecond symbol spaces over time and a number of 15 kHz subcarriers that would span the channel bandwidth, thereby defining an array of resource elements each 67 microseconds by 15 kHz, with each resource element being suitable for carrying a respective OFDM symbol representing information to be communicated from the base station to one or more of the served WCDs. In the arrangement shown, each row of resource elements is considered to be a particular symbol row or to define a particular symbol space, in that the row can concurrently carry numerous OFDM symbols across the bandwidth. In practice, these resource elements spanning the bandwidth may be numbered sequentially, so that the base station and the WCDs can refer to individual resource elements by their numbers.

As further shown by the thicker vertical lines in FIG. 2, the resource elements within each subframe may be divided into physical resource blocks, each of which may span twelve subcarriers in the frequency domain and fourteen symbol spaces in the time domain. Like the resource elements, these physical resource blocks may also be numbered sequentially, so that the base station and WCDs can refer to individual resource elements by their numbers.

In practice, the base station may broadcast a reference signal that served WCDs may measure to facilitate evaluation of coverage quality, such as to determine signal strength or signal-to-noise ratio of communication from the base station. In LTE, the base station would broadcast the reference signal in predefined resource elements distributed throughout the bandwidth and throughout each physical resource block. (FIG. 2 depicts example reference signal resource elements with stripes.) Each of the WCDs may then be arranged to periodically transmit to the base station a channel quality report established based on the WCD's evaluation of the reference signal and based on one or more other factors, such as the WCD's specific antenna structure and receiver capability. In LTE, this channel quality report is referred to as a "channel quality indicator" (CQI) report and contains at least one 4-bit integer CQI indicating a suitable downlink transmission rate, e.g., modulation and coding scheme (MCS) that the base station can use for data communications to the WCD.

Depending on configuration and operational state, WCDs may be arranged to evaluate the reference signal across the entire channel bandwidth so as to establish and report a QQI value generally for the entire channel bandwidth, or the WCDs may be arranged to evaluate the reference signal in particular sub-bands consisting of specific ranges of physical resource blocks, and to provide the base station with a sub-band CQI report specifying CQI values respectively for various sub-bands. The WCDs may be arranged to transmit these CQI reports to the base station periodically, in an uplink control channel or along with uplink data transmission to the base station. And the base station may be arranged to respond to these CQI reports by setting and applying a suitable MCS respectively for downlink data transmission to each WCD.

As the WCDs will have varying levels of channel quality, the CQI reports that the various WCDs send to the base station will differ from each other. For instance, some of the WCDs that are in relatively good coverage of the base station, such as with little or no air interface obstructions or interference, may report particularly high channel quality to the base station, while other WCDs that are in relatively poor coverage of the base station, such as with more substantial air interface obstructions or interference, may report particularly low channel quality to the base station.

Continuing with reference to FIG. 2, the first symbol row 24 across the representative subframe defines at least part of a physical downlink control channel (PDCCH). Further, as discussed above, various resource elements in that first symbol row may be used to define PHICH for carrying HARQ messaging to the served WCDs. In the arrangement shown, by way of example, the black resource elements carry PHICH symbols. Although the example subframe is shown along only a portion of the channel bandwidth, it should be understood that these PHICH resource elements would be distributed along the channel bandwidth, with some of the PHICH resource elements in various ones of the physical resource blocks.

Also per the discussion above, this first symbol row may be arranged with a number of mutually exclusive PHICH groups, each for carrying HARQ messaging to up to eight served WCDs, with the PHICH communication to each WCD in a PHICH group being distinguished from the PHICH communication to each other WCD in the PHICH group by orthogonal spreading using a respective 4-bit orthogonal spreading sequence. Further, the resource elements that make up the individual PHICH groups may be predefined or specified in an overhead system parameter broadcast to the WCDs, with each PHICH group having a respective PHICH group number and corresponding with a particular set of twelve resource elements along the first symbol row of each subframe.

In practice, when the base station schedules uplink data transmission for a WCD, the base station may indicate to the WCD which PHICH group and orthogonal spreading sequence will be used for HARQ messaging to the WCD, and the base station may then provide that HARQ messaging to the WCD in a subframe that is four milliseconds after the scheduled uplink transmission from the WCD. The WCD may thus read the respective PHICH group of resource elements in that indicated subframe and apply the indicated spreading sequence to ascertain whether the base station sent an ACK or a NACK for the WCD's data transmission.

The base station may generally have a particular amount of transmission power available for use to engage in downlink transmission at any given moment, with that power limit being set by regulation or for various operational reasons. Thus, across the entire first symbol row of each subframe, the base station may be limited to transmitting at up to that particular level of power, with the power being divided among the various resource elements, i.e., among the various subcarriers. Further, in normal operation, the base station may transmit all PHICH symbols at the same power level as each other.

In accordance with the present method, however, as discussed above, the base station will advantageously group WCDs into PHICH groups (i.e., assign WCDs to receive HARQ messaging in particular PHICH groups) based at least in part on the channel qualities that the WCDs reported to the base station, optimally striving to group together WCDs that have the most similar reported channel quality. For instance, the base station may group into one PHICH group WCDs that have reported particularly low channel quality, and the base station may group into another PHICH group WCDs that have reported particularly high channel quality.

Further, the base station will use different transmission power levels for the PHICH groups, based on the reported channel quality of the WCDs of each group. For instance, the base station may use a higher transmission power for PHICH transmission in a group of resource elements defining a PHICH group for WCDs that reported particularly low channel quality, whereas the base station may use lower transmission power for PHICH transmission in a group of resource elements defining a PHICH group for WCDs that reported particularly high channel quality. In practice, for example, the base station may essentially borrow some of the power that it would have used for transmission in resource elements of one such PHICH group and use that borrowed power for transmission in resource elements of the other such PHICH group, so as to help maintain stay within the overall transmission power limit during that symbol row.

Figure 3:
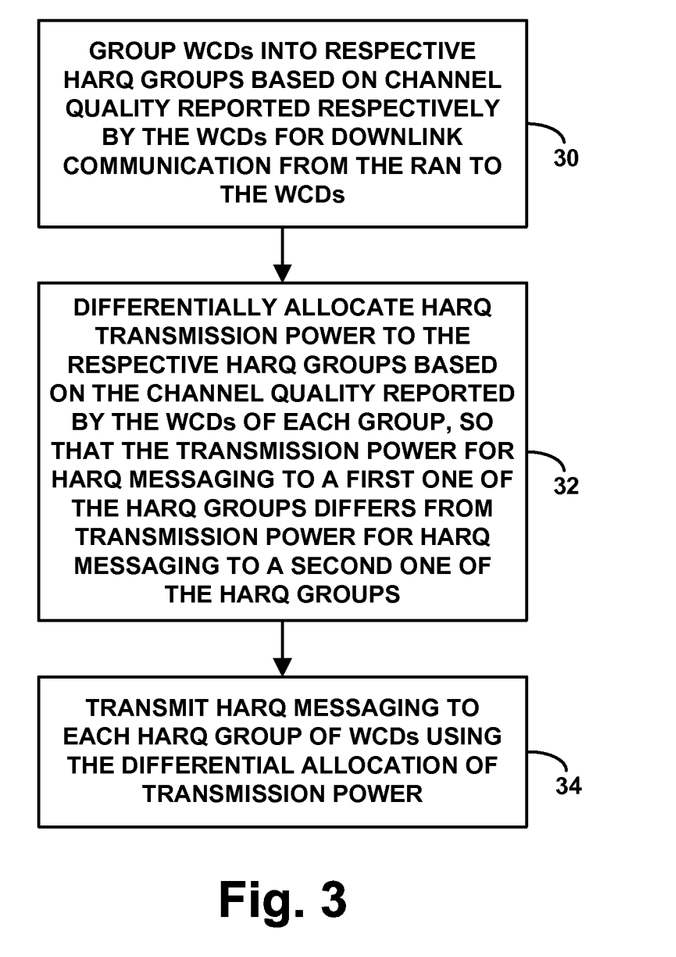
FIG. 3 is a flow chart depicting functions that can be carried out in accordance with the disclosure.

FIG. 3 is a flow chart depicting functions of this process, in a RAN that serves a plurality of WCDs as in FIG. 2 for instance. These functions may be carried out by a base station that provides a wireless coverage area in which the WCDs operate and that thus serves the WCDs in that coverage area, or the functions may be carried out by one or more other entities of the RAN.

As shown in FIG. 3, at block 30, the method involves grouping the WCDs into respective HARQ groups based on channel quality reported respectively by the WCDs for downlink communication from the RAN to the WCDs. At block 32, the method then involves differentially allocating HARQ transmission power to the respective HARQ groups based on the channel quality reported by the WCDs of each group, so that the transmission power for HARQ messaging to a first one of the HARQ groups differs from transmission power for HARQ messaging to a second one of the HARQ groups. And at block 34, the method involves transmitting HARQ messaging to each HARQ group of WCDs using the differential allocation of transmission power.

In a system in which the RAN communicates with the WCDs over an OFDMA (e.g., LTE) air interface defining a continuum of subframes each spanning a plurality of resource elements across a frequency bandwidth, such as that described above for instance, this grouping and differential power allocation can be done with respect to particular groups of resource elements, such as those defining PHICH groups, with each group of resource elements being the same quantity of resource elements as each other group of resource elements for instance, but being different resource elements distributed in a desired manner throughout the channel bandwidth.

In particular, the act of transmitting of HARQ messaging to each HARQ group of the plurality of HARQ groups can be done in a mutually exclusive group of the resource elements different than transmission of HARQ messaging to each other HARQ group of the plurality, including transmitting of HARQ messaging to the first group of the WCDs in a first group of the resource elements, and transmitting HARQ messaging to the second group of the WCDs in a second group of the resource elements. Further, the act of differentially allocating HARQ transmission power to the respective HARQ groups based on the channel quality reported by the WCDs of each group can involve (i) allocating first transmission power to the first group of the resource elements, (ii) allocating second transmission power to the second group of the resource elements, and (iii) making the second transmission power higher than the first transmission power in response to the second group of WCDs having reported lower channel quality than the first group of WCDs.

As discussed above, the RAN may have a total extent of transmission power usable for transmission in the resource elements across the frequency bandwidth, in which case the act of differentially allocating HARQ transmission power to the respective HARQ groups based on the channel quality reported by the WCDs of each group may involve borrowing transmission power from the first HARQ group and using the borrowed transmission power for the second HARQ group, to help maintain the overall transmission power during the concurrent transmission to the two HARQ groups.

Further, the act of grouping the WCDs into the respective HARQ groups based on channel quality reported respectively by the WCDs for downlink communication from the RAN to the WCDs may involve (i) assigning the first group of WCDs to the first HARQ group in response to the first group of WCDs having reported channel quality similar to each other and (ii) assigning the second group of WCDs to the second HARQ group in response to the second group of WCDs having reported channel quality similar to each other.

In practice, for instance, this grouping of the WCDs into the HARQ groups may be done based on channel quality reports received from the WCDs, indicating respective downlink channel quality as determined by the WCDs. For instance, as the base station receives CQI reports from the WCDs, the base station may maintain records of those CQI reports per WCD. When assigning uplink transmission resources to the WCDs, the base station may then group WCDs into HARQ groups based on their reported CQI or other channel quality measures per WCD (e.g., signal strength, signal-to-noise ratio, etc.), grouping together WCDs with the same or the most similar reported QCI for instance.

Further, in a scenario where the base station receives subband channel quality reports from WCDs the base station could intentionally assign particular groups of resource elements to particular HARQ groups of WCDs based on such sub-band quality reports, to help further optimize HARQ messaging receipt. For instance, in response to the WCDs of a particular HARQ group having reported for a particular sub-band a channel quality that is at least as high as a predefined threshold level (selected to represent high quality), the base station may assign for HARQ messaging to that HARQ group a particular set of resource elements within that sub-band, or largely overlapping with that sub-band. That way, there may be increased likelihood of successful HARQ receipt by the WCDs of that HARQ group.

In practice, a base station that carries out these functions may include an antenna structure and a power amplifier arranged to supply transmission power on a per resource element basis. In that case, the act of transmitting HARQ messaging to each HARQ group using the differential allocation of transmission power may involve controlling the power amplifier to apply the differential allocation. For instance, a controller function in the base station may programmatically control the power amplifier to supply different power to particular resource elements so as to apply the differential power allocation to the various HARQ groups.

Figure 4:
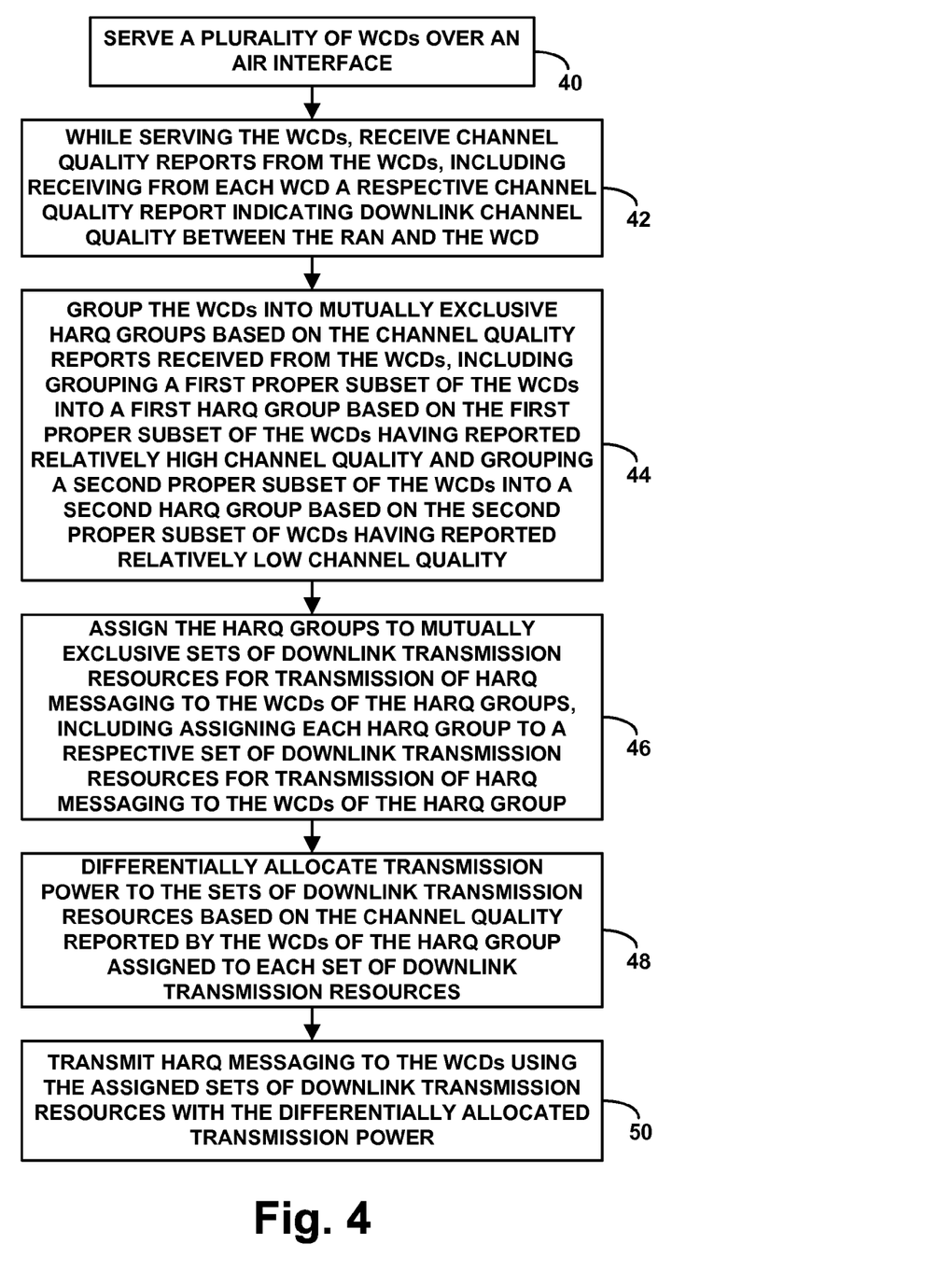
FIG. 4 is another flow chart depicting functions that can be carried out in accordance with the disclosure.

FIG. 4 is next another flow chart depicting functions that can be carried out in accordance with the present disclosure. As shown in FIG. 4 at block 40, the method involves a RAN serving a plurality of WCDs over an air interface between the RAN and the WCDs. For instance, the RAN may include a base station that provides a coverage area defining the air interface, and the base station may enable the WCDs to engage in data communication on a transport network, scheduling air interface transmission between the base station and the WCDs over the air interface.

Further, at block 42, the method involves, while the RAN is serving the plurality of WCDs (e.g., while the WCDs are in a connected mode for engaging in data communication served by the RAN), the RAN receiving channel quality reports from the WCDs, including receiving from each WCD a respective channel quality report indicating downlink channel quality between the RAN and the WCD. For instance, these channel quality reports may comprise CQI reports (e.g., channel wide or sub-band) as discussed above.

At block 44, the method then involves the RAN grouping the WCDs into mutually exclusive HARQ groups based on the channel quality reports received from the WCDs, including grouping a first proper subset of the WCDs into a first HARQ group based on the first proper subset of the WCDs having reported relatively high channel quality and grouping a second proper subset of the WCDs into a second HARQ group based on the second proper subset of WCDs having reported relatively low channel quality. The "relatively high channel quality" and "relatively low channel quality" can be defined with respect to each other, so that the base station may divide the WCDs into two or more such groups (e.g., of eight or more each) based on similarity of their reported channel quality.

Further, at block 46, the method involves assigning the HARQ groups to mutually exclusive sets of downlink transmission resources for transmission of HARQ messaging to the WCDs of the HARQ groups, including assigning each HARQ group to a respective set of downlink transmission resources for transmission of HARQ messaging to the WCDs of the HARQ group. For instance, the RAN may assign each HARQ group to a particular mutually exclusive group of resource elements as discussed above, possibly with the group of resource elements being selected based on the channel quality reports of the WCDs in the HARQ group as also discussed above, such as in response to the WCDs of the group having reported threshold high channel quality for resource elements associated the particular group of resource elements (e.g., for those very resource elements of the group and/or for resource elements nearby or overlapping with those resource elements of the group).

At block 48, the method then involves differentially allocating transmission power to the sets of downlink transmission resources based on the channel quality reported by the WCDs of the HARQ group assigned to each set of downlink transmission resources. For instance, in an implementation where the different transmission resources are different mutually exclusive sets of resource elements, the RAN may assign different downlink transmission power to the different mutually exclusive sets of resource elements. In line with the discussion above, the RAN may thereby make the transmission power that it allocates to one of the mutually exclusive groups of resource elements be higher than the transmission power that it allocates to another of the mutually exclusive groups of resource elements in response to the WCDs of the one HARQ group having reported lower channel quality than the WCDs of the other HARQ group.

And at block 50, the method involves transmitting HARQ messaging to the WCDs using the assigned sets of downlink transmission resources with the differentially allocated transmission power. For instance, for one such HARQ group to a particular group of WCDs, the RAN may transmit HARQ messaging in a set of resource elements at a particular transmission power level selected based on the channel quality reported by the WCDs of that group, with the transmission concurrently going to all WCDs of that group but providing a separate HARQ message to each WCD by use of orthogonal spreading. Further, concurrently with that transmission, the RAN may transmit HARQ messaging to another HARQ group of WCDs, in another set of resource elements and at another transmission power level selected based on the channel quality reported by the WCDs of that other group, and with the transmission concurrently going to all WCDs of that other group but providing separate HARQ message to each WCD by use of orthogonal spreading.

Further in line with the discussion above, the RAN may have a total extent of transmission power usable for transmission in the resource elements across the frequency bandwidth, in which case the act of allocating different transmission power to the different mutually exclusive groups of resource elements may involve borrowing transmission power from the first mutually exclusive group of resource elements and using the borrowed power for the second mutually exclusive group of resource elements.

Figure 5:
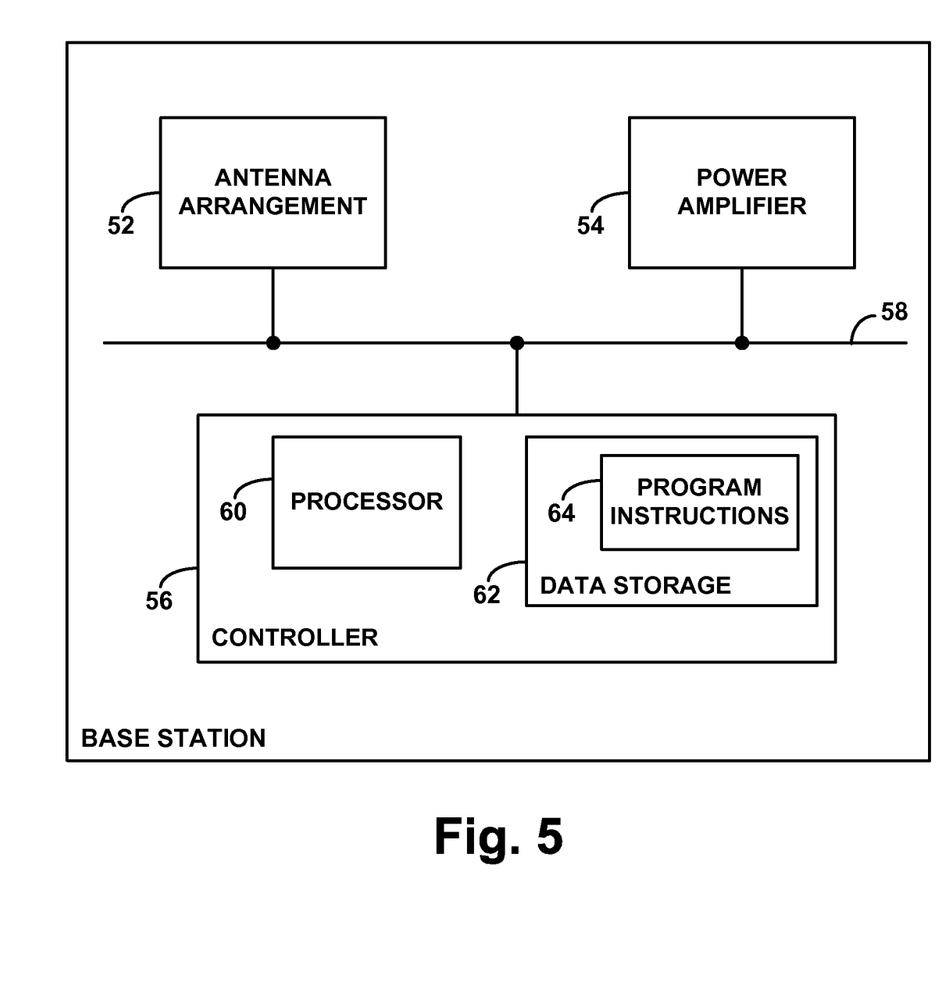
FIG. 5 is a simplified block diagram of a base station operable in accordance with the disclosure.

Finally, FIG. 5 is a simplified block diagram of an example eNodeB arranged to carry out functions of the present disclosure. As shown in FIG. 5, the example eNodeB includes an antenna structure 52 for wirelessly communicating with UEs served by the eNodeB over an OFDMA air interface defining a continuum of subframes each spanning a plurality of resource elements across a frequency bandwidth. Further, the eNodeB includes a power amplifier 54 that is arranged to control power of transmission by the antenna structure within the resource elements, thus on a per sub-carrier basis across the channel bandwidth.

Still further, the eNodeB includes a controller 56 that is arranged to carry out various base station functions such as those described above. For instance, the controller may be arranged to group the served UEs into PHICH groups based on downlink channel quality reported by the UEs, the eNodeB being arranged to transmit HARQ messaging respectively to each PHICH group of UEs in a respective mutually exclusive group of the resource elements. Further, the controller may be arranged to cause the power amplifier to differentially allocate transmission power to resource elements used for transmission of HARQ messaging to the PHICH groups of UEs, the differential allocation being based on the downlink channel quality reported by the UEs of the respective PHICH groups. For instance, the power amplifier may be programmatically controllable to output specified power per subcarrier across the channel bandwidth, and the controller may programmatically control the power amplifier to provide specific transmission power in particular ones of the resource elements per the discussion above.

As shown, these components of the eNodeB may be communicatively linked together by a system bus, network, or other connection mechanism 58. Alternatively, they may be integrated together in various ways. Further, as shown, the controller 56 may include a processing unit 60 (e.g., one or more general purposes processors and/or special-purpose processors), data storage 62 (e.g., one or more volatile or non-volatile storage components, such as magnetic, optical, or flash storage), and program instructions 64 stored in the data storage and executable by the processing unit to carry out the various controller functions.

In line with the discussion above, the act of the eNodeB grouping the UEs into PHICH groups based on downlink channel quality may involve (a) assigning a first group of the UEs to a first PHICH group in response to the UEs of the first group having reported downlink channel quality similar to each other and (b) assigning a second group UEs to a second PHICH group in response to the UEs of the second group having reported downlink channel quality similar to each other.

Further in line with the discussion above, the power amplifier may have a total extent of transmission power usable for transmission in the resource elements across the frequency bandwidth, in which case the act of causing the power amplifier to differentially allocate transmission power to the resource elements used for transmission of HARQ messaging to the PHICH groups of UEs based on the downlink channel quality reported by the UEs of the respective PHICH groups may involve causing the power amplifier to borrow transmission power from a first one of the PHICH groups of UEs that reported a first downlink channel quality and to use the borrowed transmission power for another one of the PHICH groups of UEs that reported a second downlink channel quality, based on the second downlink channel quality being lower than the first downlink channel quality.

Moreover, also in line with the discussion above, the controller may be configured to assign a particular one of the PHICH groups to a particular one of the mutually exclusive groups of resource elements based on downlink channel quality that the UEs of the particular PHICH group reported for one or more resource elements associated with that mutually exclusive group of resource elements, such as one or more resource elements of a range of physical resource blocks encompassing or overlapping with the mutually exclusive group of resource elements. For instance, the controller may assign the particular PHICH group to the particular group of resource elements based on the downlink channel quality that the UEs of the particular PHICH group reported specifically for that group of resource elements being at least as high as a predefined threshold selected to indicate high channel quality.

Exemplary embodiments have been described above. It should be understood, however, that variations from these embodiments are possible, while remaining within the true spirit and scope of the invention.

We claim:

1. A method comprising:
in a cellular radio access network (RAN) that serves a plurality of wireless communication devices (WCDs), grouping the WCDs into respective Hybrid-ARQ (HARQ) groups based on channel quality reported respectively by the WCDs for downlink communication from the RAN to the WCDs, wherein grouping the WCDs into the respective HARQ groups based on channel quality reported respectively by the WCDs for downlink communication from the RAN to the WCDs comprises (a) assigning the first group of WCDs to the first HARQ group in response to the first group of WCDs having reported channel quality similar to each other, and (b) assigning the second group of WCDs to the second HARQ group in response to the second group of WCDs having reported channel quality similar to each other;
differentially allocating HARQ transmission power to the respective HARQ groups based on the channel quality reported by the WCDs of each group; and
transmitting HARQ messaging to each HARQ group of WCDs using the differential allocation of transmission power,
whereby transmission power for HARQ messaging to a first one of the HARQ groups differs from transmission power for HARQ messaging to a second one of the HARQ groups.

2. The method of claim 1,
wherein the RAN communicates with the WCDs over an Orthogonal Frequency Division Multiple Access (OFDMA) air interface defining a continuum of subframes each spanning a plurality of resource elements across a frequency bandwidth,
wherein the transmitting of HARQ messaging to each HARQ group of the plurality of HARQ groups is done in a mutually exclusive group of the resource elements different than transmission of HARQ messaging to each other HARQ group of the plurality, including transmitting of HARQ messaging to the first group of the WCDs in a first group of the resource elements, and transmitting HARQ messaging to the second group of the WCDs in a second group of the resource elements, and
wherein differentially allocating HARQ transmission power to the respective HARQ groups based on the channel quality reported by the WCDs of each group comprises (i) allocating first transmission power to the first group of the resource elements, (ii) allocating second transmission power to the second group of the resource elements, and (iii) making the second transmission power higher than the first transmission power in response to the second group of WCDs having reported lower channel quality than the first group of WCDs.

3. The method of claim 2, wherein the RAN has a total extent of transmission power usable for transmission in the resource elements across the frequency bandwidth, and wherein differentially allocating HARQ transmission power to the respective HARQ groups based on the channel quality reported by the WCDs of each group comprises borrowing transmission power from the first HARQ group and using the borrowed transmission power for the second HARQ group.

4. The method of claim 2, further comprising:
receiving, by the RAN from the served WCDs, channel quality reports indicating respective downlink channel quality as determined by the WCDs, wherein the grouping of the WCDs into the respective HARQ groups is based on the received channel quality reports.

5. The method of claim 4, wherein the channel quality report received from at least one of the WCDs in a particular HARQ group specifies downlink channel quality associated with a particular one of the mutually exclusive group of resource elements, the method further comprising:

based on the specified downlink channel quality for the particular mutually exclusive group of resource elements, assigning the particular mutually exclusive group of resource elements to be used for transmission of HARQ messaging to the particular HARQ group.

6. The method of claim 5, wherein assigning the particular mutually exclusive group of resource elements to be used for transmission of HARQ messaging to the particular HARQ group based on the specified downlink channel quality for the particular mutually exclusive group of resource elements comprises:

assigning the particular mutually exclusive group of resource elements to be used for transmission of HARQ messaging to the particular HARQ group in response to the specified downlink channel quality for the particular mutually exclusive group of resource elements being threshold high.

7. The method of claim 1, wherein the RAN includes a base station, and wherein the assigning, allocating, and transmitting are carried out by the base station.

8. The method of claim 7, wherein the base station includes an antenna structure and a power amplifier arranged to supply transmission power on a per resource element basis, and wherein transmitting HARQ messaging to each HARQ group using the differential allocation of transmission power comprises controlling the power amplifier to apply the differential allocation.

9. An eNodeB comprising:

an antenna structure for wirelessly communicating with user equipment devices (UEs) served by the eNodeB over an orthogonal frequency division multiple access (OFDMA) air interface defining a continuum of subframes each spanning a plurality of resource elements across a frequency bandwidth;

a power amplifier arranged to control power of transmission within the resource elements; and a controller arranged (i) to group the served UEs into Physical Hybrid ARQ Indicator Channel (PHICH) groups based on downlink channel quality reported by the UEs, wherein the eNodeB transmits HARQ messaging respectively to each PHICH group of UEs in a respective mutually exclusive group of the resource elements, and (ii) to cause the power amplifier to differentially allocate transmission power to resource elements used for transmission of HARQ messaging to the PHICH groups of UEs, the differential allocation being based on the downlink channel quality reported by the UEs of the respective PHICH groups, wherein grouping the served UEs into PHICH groups based on downlink channel quality comprises (a) assigning a first group of the UEs to a first PHICH group in response to the UEs of the first group having reported downlink channel quality similar to each other and (b) assigning a second group UEs to a second PHICH group in response to the UEs of the second group having reported downlink channel quality similar to each other.

10. The eNodeB of claim 9, wherein the controller comprises a processing unit, data storage, and program instructions stored in the data storage and executable by the processor to carry out the grouping and causing.

11. The eNodeB of claim 9, wherein the power amplifier has a total extent of transmission power usable for transmission in the resource elements across the frequency bandwidth, and wherein causing the power amplifier to differentially allocate transmission power to the resource elements used for transmission of HARQ messaging to the PHICH groups of UEs based on the downlink channel quality reported by the UEs of the respective PHICH groups comprises:

causing the power amplifier to borrow transmission power from a first one of the PHICH groups of UEs that reported a first downlink channel quality and to use the borrowed transmission power for another one of the PHICH groups of UEs that reported a second downlink channel quality, based on the second downlink channel quality being lower than the first downlink channel quality.

12. The eNodeB of claim 9, wherein the controller is further configured to assign a particular one of the PHICH groups to a particular one of the mutually exclusive groups of resource elements based on downlink channel quality that the UEs of the particular PHICH group reported for one or more resource elements associated with that mutually exclusive group of resource elements.

13. The eNodeB of claim 12, wherein assigning the particular PHICH group to the particular group of resource elements based on downlink channel quality that the UEs of the particular PHICH group reported for one or more resource elements associated with that group of resource elements comprises assigning the particular PHICH group to the particular group of resource elements based on the downlink channel quality that the UEs of the particular PHICH group reported for one or more resource elements associated with that group of resource elements being threshold high.

14. A method comprising:

serving, by a radio access network (RAN), a plurality of wireless communication devices (WCDs) over an air interface between the RAN and the WCDs;

while serving the plurality of WCDs, receiving channel quality reports into the RAN from the WCDs, including receiving from each WCD a respective channel quality report indicating downlink channel quality between the RAN and the WCD;

grouping the WCDs, by the RAN, into mutually exclusive Hybrid-ARQ (HARQ) groups based on the channel quality reports received from the WCDs, including grouping a first proper subset of the WCDs into a first HARQ group based on the first proper subset of the WCDs having reported relatively high channel quality and grouping a second proper subset of the WCDs into a second HARQ group based on the second proper subset of WCDs having reported relatively low channel quality;

assigning the HARQ groups to mutually exclusive sets of downlink transmission resources for transmission of HARQ messaging to the WCDs of the HARQ groups, including assigning each HARQ group to a respective set of downlink transmission resources for transmission of HARQ messaging to the WCDs of the HARQ group;

differentially allocating transmission power to the sets of downlink transmission resources based on the channel quality reported by the WCDs of the HARQ group assigned to each set of downlink transmission resources; and transmitting HARQ messaging to the WCDs using the assigned sets of downlink transmission resources with the differentially allocated transmission power.

15. The method of claim 14,
wherein the air interface is an Orthogonal Frequency Division Multiple Access (OFDMA) air interface defining a continuum of subframes each spanning a plurality of resource elements across a frequency bandwidth,
wherein each assigned set of downlink transmission resources is a mutually exclusive set of the resource elements different than each other set of downlink transmission resources, and
wherein differentially allocating transmission power to the sets of downlink transmission resources comprises allocating different downlink transmission power to the different mutually exclusive sets of resource elements.

16. The method of claim 15, wherein allocating different transmission power to the different mutually exclusive sets of resource elements comprises:
allocating first transmission power to a first one of the mutually exclusive groups of resource elements to which the first HARQ group is assigned,
allocating second transmission power to the second one of the mutually exclusive groups of resource elements to which the second HARQ group is assigned, and
making the second transmission power higher than the first transmission power in response to the WCDs of the second HARQ group having reported lower channel quality than the WCDs of the first HARQ group.

17. The method of claim 16, wherein the RAN has a total extent of transmission power usable for transmission in the resource elements across the frequency bandwidth, and wherein allocating different transmission power to the different mutually exclusive groups of resource elements comprise borrowing transmission power from the first mutually exclusive group of resource elements and using the borrowed power for the second mutually exclusive group of resource elements.

18. The method of claim 14, further comprising:
assigning a particular one of the HARQ groups to a particular one of the mutually exclusive groups of resource elements in response to the WCDs of the particular HARQ group having reported threshold high channel quality specifically for resource elements associated with the particular group of resource elements.

\* \* \* \* \*